(12) United States Patent
Anschel et al.

(10) Patent No.: US 10,132,324 B2
(45) Date of Patent: Nov. 20, 2018

(54) COMPRESSOR RECIRCULATION INTO ANNULAR VOLUME

(71) Applicant: BorgWarner Inc., Auburn Hills, MI (US)

(72) Inventors: Paul K Anschel, Asheville, NC (US); David G Grabowska, Asheville, NC (US); Brock Fraser, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/744,073

(22) Filed: Jun. 19, 2015

(65) Prior Publication Data

US 2015/0285257 A1 Oct. 8, 2015

Related U.S. Application Data

(62) Division of application No. 13/817,906, filed as application No. PCT/US2011/049658 on Aug. 30, 2011, now Pat. No. 9,091,232.

(Continued)

(51) Int. Cl.
*F02B 33/44* (2006.01)
*F04D 27/02* (2006.01)
(Continued)

(52) U.S. Cl.
CPC ......... *F04D 27/0238* (2013.01); *F01D 9/026* (2013.01); *F01D 17/105* (2013.01);
(Continued)

(58) Field of Classification Search
CPC .. F04D 27/0215; F04D 27/0238; F01D 9/026; F02B 37/16; F02D 41/0007
(Continued)

(56) References Cited

U.S. PATENT DOCUMENTS 3,362,629 A * 1/1968 Papapanu ............. F04D 29/682
                                                    415/200
4,517,803 A * 5/1985 Jamison .................. F02B 37/16
                                                    60/611

(Continued)

FOREIGN PATENT DOCUMENTS

CN          1542289        11/2004
CN          1678816        10/2005
(Continued)

*Primary Examiner* — Ngoc T Nguyen
(74) *Attorney, Agent, or Firm* — Eric L. Doyle; Stephan A. Pendorf; Patent Central LLC

(57) ABSTRACT

To solve the problems of compressor wheel blade flow separation causing surge type noises when a compressor return or recirculation valve is opened or closed, recirculation airflow from a compressor recirculation valve is fed into an annular volume, defined between inner and outer walls or shaped as a radially expanded, axially flattened cylindrical space in the compressor inlet, so that the generally unidirectional radial flow from the compressor recirculation valve is re-directed and organized as it is turned from generally radial to generally axial, merging with the general inlet flow and presenting the compressor wheel with airflow of "circumferentially uniform" flow velocity.

3 Claims, 11 Drawing Sheets

Related U.S. Application Data

(60) Provisional application No. 61/379,468, filed on Sep. 2, 2010.

(51) Int. Cl.
    *F01D 9/02*         (2006.01)
    *F01D 17/10*      (2006.01)
    *F01D 17/16*      (2006.01)
    *F02C 6/12*         (2006.01)
    *F02B 37/16*      (2006.01)
    *F02M 26/06*     (2016.01)
    *F02M 26/09*     (2016.01)
    *F02M 26/19*     (2016.01)

(52) U.S. Cl.
    CPC ........... *F01D 17/165* (2013.01); *F02B 37/16* (2013.01); *F02C 6/12* (2013.01); *F02M 26/06* (2016.02); *F02M 26/09* (2016.02); *F02M 26/19* (2016.02); *F05D 2220/40* (2013.01); *Y02T 10/144* (2013.01)

(58) Field of Classification Search
    USPC .......... 415/200, 144, 58.4, 205, 206; 60/611
    See application file for complete search history.

(56) References Cited

U.S. PATENT DOCUMENTS

| | | | | |
|---|---|---|---|---|
| 5,137,003 A | * | 8/1992 | Kyoya | ............... F02B 37/16 60/611 |
| 5,173,021 A | * | 12/1992 | Grainger | ............ F02B 37/16 60/611 |
| 2001/0028839 A1 | | 10/2001 | Nakao | |
| 2008/0223037 A1 | | 9/2008 | Ren et al. | |

FOREIGN PATENT DOCUMENTS

| | | | | |
|---|---|---|---|---|
| CN | 101027491 | | 8/2007 | |
| DE | 102008047506 | | 4/2010 | |
| EP | 2615308 A1 | * | 7/2013 | ......... F04D 27/0215 |
| JP | 7279677 | | 10/1995 | |
| JP | 200064848 | | 2/2000 | |
| JP | 2004332734 | | 11/2004 | |
| JP | WO 2005121559 A1 | * | 12/2005 | ......... F04D 27/0215 |
| JP | 200913814 | | 1/2009 | |

* cited by examiner

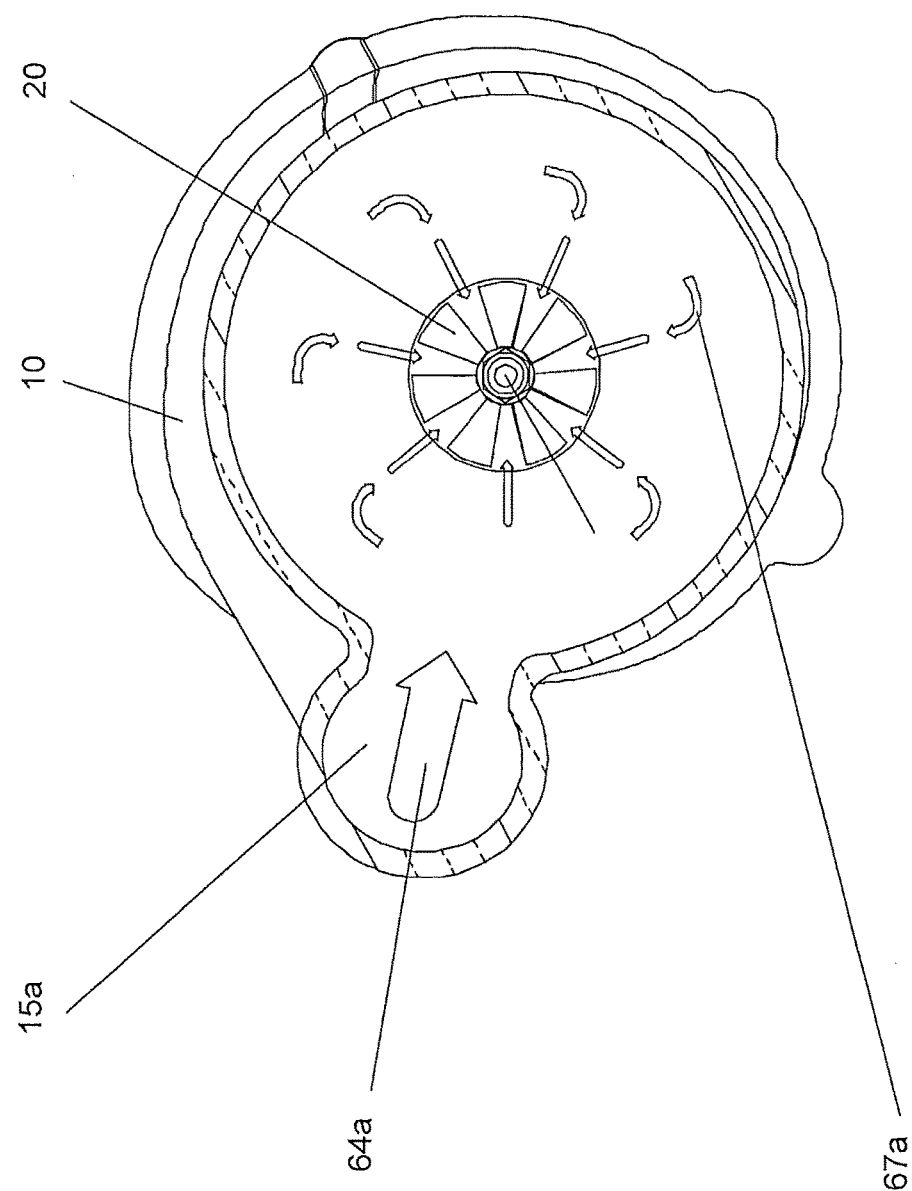

COMPRESSOR RECIRCULATION INTO ANNULAR VOLUME

CROSS REFERENCE TO RELATED APPLICATIONS

This application is a divisional application of U.S. patent application Ser. No. 13/817,906 filed on Feb. 20, 2013, which claims the priority to U.S. Provisional Application No. 61/379,468, filed on Sep. 2, 2010. All applications are incorporated herein by reference in their entireties.

FIELD OF THE INVENTION

This invention is directed to the configuration of a turbocharger duct, integrated into a compressor cover, delivering recirculation air from a compressor discharge to a compressor inlet, in such a manner as to not cause surge events or noise.

BACKGROUND OF THE INVENTION

Turbochargers deliver air, at greater density than would be possible in the normally aspirated configuration, to the engine intake, allowing more fuel to be combusted, thus boosting the engine's horsepower without significantly increasing engine weight. A smaller turbocharged engine can replace a normally aspirated engine of a larger physical size, thus reducing the mass and aerodynamic frontal area of the vehicle.

Turbochargers are a type of forced induction system which uses the exhaust flow entering the turbine housing from the engine exhaust manifold to drive a turbine wheel (51) which is located in a turbine housing (2). The turbine wheel is solidly affixed to a shaft to become the shaft and wheel assembly. The primary function of the turbine wheel is extracting rotational power from the exhaust gas and using this power to drive the compressor.

The compressor stage consists of a wheel (20) and it's housing (10). The compressor wheel (20) is mounted to a stub shaft end of the shaft and wheel assembly and is held in position by the clamp load from a compressor nut. Filtered air is drawn axially into the inlet (14) of the compressor cover by the rotation of the compressor wheel at very high RPM. The turbine stage drives the compressor wheel to produce a combination of static pressure with some residual kinetic energy and heat. The pressurized gas exits the compressor cover through a compressor discharge (15) and is delivered, usually via an intercooler, to the engine intake.

Compressor surge occurs when the compressor attempts to deliver more massflow to the engine than is possible at the existing engine operating condition, i.e., aerodynamic stall. The compressor stage begins to oscillate in terms of pressure: mass flow, speed, and net aerodynamic thrust. This oscillating instability can be quite damaging to the turbocharger, also producing an irritating noise which can be heard by the driver and is usually described as a "bark" or "squawk". The location of surge for a given compressor design can be described as a function of pressure and mass flow at a given rotational speed.

Compression ignition (CI) engines have air induced directly into the cylinder. The air is compressed by the piston on the compression stroke, and the fuel is injected into the heated compressed air just before the piston reaches top dead center (TDC).

In turbocharged CI engines the mass flow of air is delivered by the turbocharger output, and the fuel flow is metered and injected directly into the combustion chamber. Some CI engines are equipped with throttles.

Spark Ignited (SI) engines may mix the combustion air with fuel in the inlet manifold. The resultant air-fuel mixture is controlled by a throttle valve prior to entering the combustion chamber. The throttle valve, or plate, is typically located in a throttle body with relatively close tolerances and has the ability to close off the airflow to the engine. SI engines may also inject fuel directly into the cylinder.

"Tip-in" is the term used to refer to the action of driver's foot depressing the accelerator pedal to adjust engine load. Engine speed may remain the same, driving up a hill, for example, or the engine may increase from low engine speed to higher engine speed. "Tip-out" is the term used to refer to the opposite action of the driver's foot lifting off the pedal.

Compressor Recirculation Valves (CRV) and the ducts connecting the exhaust from the compressor to the inlet to the valve and the exhaust from the valve to the inlet of the compressor, collectively hereafter the "CRV system", are used today in many SI and CI engines, or engines employing throttle plates for air control, typically to prevent surge. The closing of the throttle plate, at accelerator pedal tip-out, for example, closes the duct from the compressor discharge to the engine inlet and causing a sudden reduction in compressor flow resulting in the compressor stage to going into surge. CRV systems in general deliver air from the compressor discharge duct (the duct connecting the compressor discharge to the engine inlet or intercooler, depending upon the engine configuration) to the ducting upstream of the compressor inlet, or directly to the compressor inlet.

The output of the compressor recirculation valve may be connected to the compressor inlet by ducting to the compressor inlet or ducting to the compressor wheel. Alternatively, the compressor recirculation valve and ducting may be part of the compressor cover casting. Similarly the input to the compressor recirculation valve may be a duct connecting the CRV to the compressor discharge, or the input to the CRV may be part of the compressor cover.

The CRV system may be connected to the compressor by ducting to the compressor in several ways. Some systems have piping from the compressor discharge to the CRV valve, and then from the CRV valve to the ambient inlet duct from the air cleaner or even the compressor inlet duct; some have parts of this arrangement only (for example the CRV may be mounted to the compressor cover discharge with a flexible pipe to the compressor inlet); some have the CRV integrated directly into the compressor cover. The invention teaches the method of directing the recirculated air to the compressor wheel, regardless of the design by which the CRV assembly may be mounted.

When the CRV valve is opened, a volume of high pressure compressor discharge air radially enters the compressor inlet, joining the axially flowing main stream, causing a sudden inrush of air through the aperture in the compressor cover inducer (defined below) and can cause cavity resonance noise akin to that of blowing over the opening in the neck of a bottle. This noise may also be irritating to the driver. In FIG. 2A the inlet air (61) is sucked axially into and through the compressor wheel (20) compressed and ejected from the compressor wheel through the diffuser (11) into the volute (12), where the velocity component of air from the compressor wheel and the diffuser is collected and translated to pressure. Typically there exists a CRV (80) which controls a recirculation flow of pressurized air (62) from the compressor discharge (15). With the CRV (80) in the open position, or modulated towards the open position, the recirculation air (64) is admitted to a recirculation duct (16) and thence admitted into the compressor inlet (e.g., the region directly upstream of the compressor wheel leading edge (24).

Because the duct (16), when fluidly connecting the compressor discharge (15) to the CRV; and the CRV to the compressor stage inlet (14); dumps the unidirectionally, generally radially flowing, high pressure recirculation air directly into the axially flowing main inlet airflow (61) and then to the inducer area (14a) the velocity distribution across the plane of leading edges (24) of the compressor wheel is not uniform. This lack of circumferentially uniform airflow velocity is sucked into the compressor wheel which results in some flow aligned with the blades and some flow not aligned with the blades. Some blades are fully loaded while some blades may be in a negative pressure condition.

FIG. 2B is a view of the section "A-A" of FIG. 2A. In FIG. 2B, the generally radial airflow is depicted in plan view. In this section view, the airflow (64) from the discharge duct (15, 15a) is introduced into the CRV duct (16) connecting the CRV to the compressor inlet. The generally radial airflow (65) from the CRV duct dumps directly into the axial main compressor inlet flow (61) without the opportunity for the merged airflow to be conditioned; thus, the air ingested by the compressor wheel is generally unconditioned from a velocity standpoint.

This duct configuration causes a pressure gradient across the inlet to the compressor wheel which, when severe, can cause an uneven blade loading of the compressor wheel blades. This excitation can result in high cycle fatigue (HCF) of said blades. In addition this duct configuration also causes the surge noise described above. This phenomenon also causes a reduction in stage efficiency when the CRV is open.

So it can be seen that "dumping" compressor recirculation flow directly into the compressor wheel causes not only noise, but also the potential for compressor wheel blade failure and a general loss of efficiency when the CRV is open.

SUMMARY OF THE INVENTION

There existed a need to solve the problems of noise generated during the CRV opening and or closing event(s).

The inventors solved the problems by providing an annular transition cavity surrounding the inducer, in which to condition the merging airflow and generate airflow of uniform velocity and direction to the inducer and thus the compressor wheel.

BRIEF DESCRIPTION OF THE DRAWINGS

The present invention is illustrated by way of example and not by limitation in the accompanying drawings in which like reference numbers indicate similar parts and in which:

FIG. 5B depicts a section C-C of the cover of FIG. 5A;

DETAILED DESCRIPTION OF THE INVENTION

Figure 1:
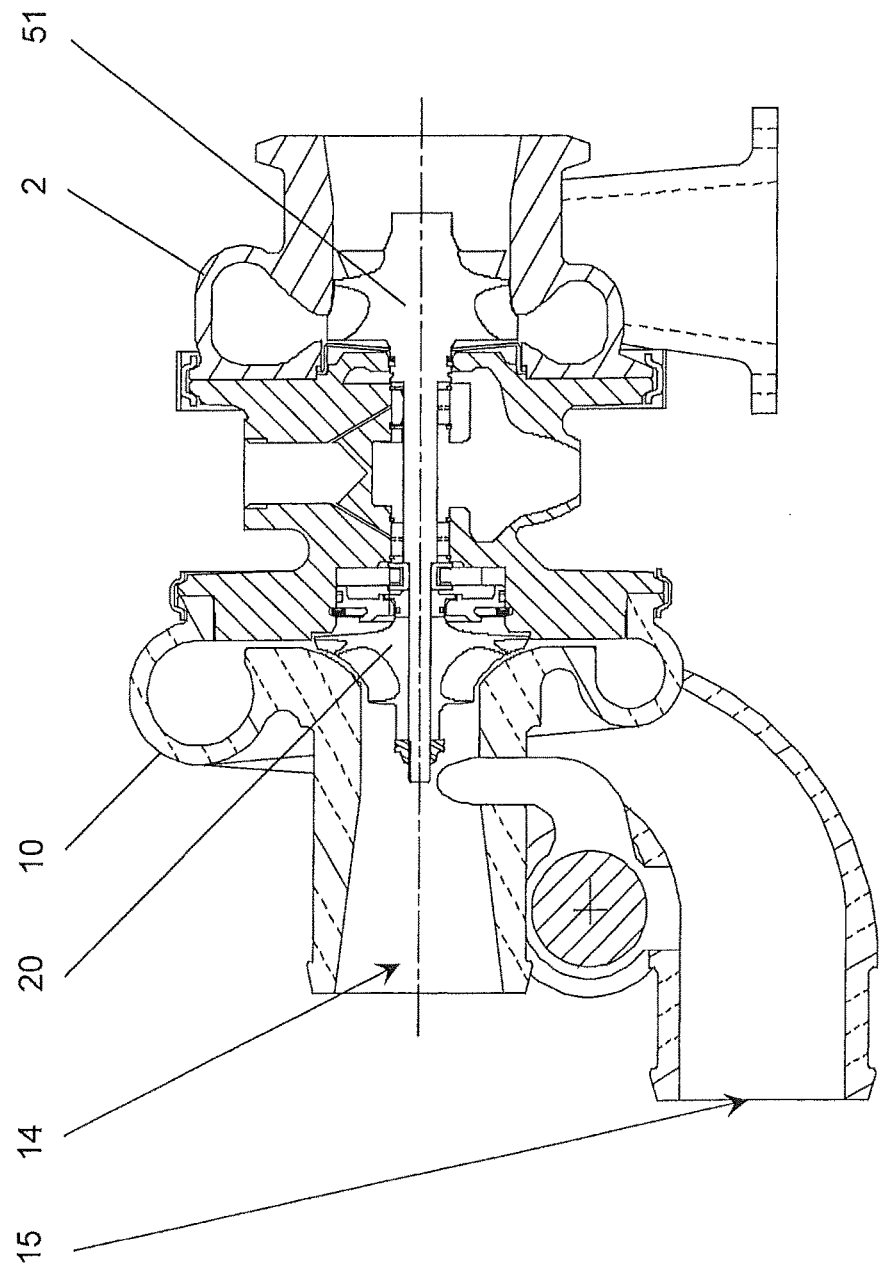
FIG. 1 depicts a section of a typical turbocharger assembly.

To the aerodynamicist, airflow through a compressor stage can be quite complex to describe with a high degree of precision. However, for purposes of understanding the principles of the present invention, the discussion of airflow can be greatly simplified. It is simply necessary to understand that in the inventive duct the air fed from the CRV duct into the compressor inlet does not enter from one direction (i.e., as does the duct outlet in the conventional CRV system), but is caused to be distributed generally uniformly about the circumference of the compressor inlet prior to being introduced into, and merged with, the main axial airflow. In the following, the inventive IGV system design, and the airflow through the inventive compressor, will be described in greater detail, but when discussing flow will use only the main directions of flow. In general, artifacts such as swirl, whirl, and turbulence will not be taken into consideration. Unless otherwise indicated, the following terms shall have the following meanings:

"Generally radial" refers to the component of flow generally flowing away from, or converging towards, the axis which is a continuation of the compressor wheel axis, and includes flow having some non purely radial component (e.g., axial component or tangential component.

"Generally axial" refers to the component of flow generally flowing parallel to the axis of the turbocharger, even if the flow has some whirl or non parallel component "Upstream" and "downstream" are with reference to the major component of flow, i.e., flow going from compressor inlet to compressor wheel. These terms do not refer to immediate flow in the CRV duct, the annular cavity, or the radially compressed, axially expanded volume extending from the compressor inlet.

"Axially flattened, radially expanded volume" means that the shape of the typically cylindrical, but frequently curved or non-cylindrical, channel wall (22) is modified by being expanded radially, with radial expansion greater than axial height.

The inventors determined through testing that for 0.03 seconds during the opening of the CRV there was a squawking sound. Through Computational Fluid Dynamics (CFD) modelling it was found that the noises were due to the dumping of unconditioned recirculation air from the compressor discharge into the lower compressor inlet and thence to inducer of the compressor wheel. The primary velocity component of the flow from the CRV duct is unidirectional or nearly unidirectional, and generally radial, thus generally perpendicular to the axial velocity of the main compressor flow. In order for the compressor wheel blades to be uniformly loaded, the (generally unidirectionally radially) CRV flow has to be converted to generally uniform axial velocity before it is ingested into the compressor wheel. Without something to channel the flow and get it uniformly, i.e., evenly around 360°, flow transitioned and thus aligned with the axial main compressor inlet flow, the CRV flow does not mix well; so the compressor wheels ends up ingesting highly disorganized flow. Some blades are fully loaded while some blades are practically in a vacuum.

Figure 2A:
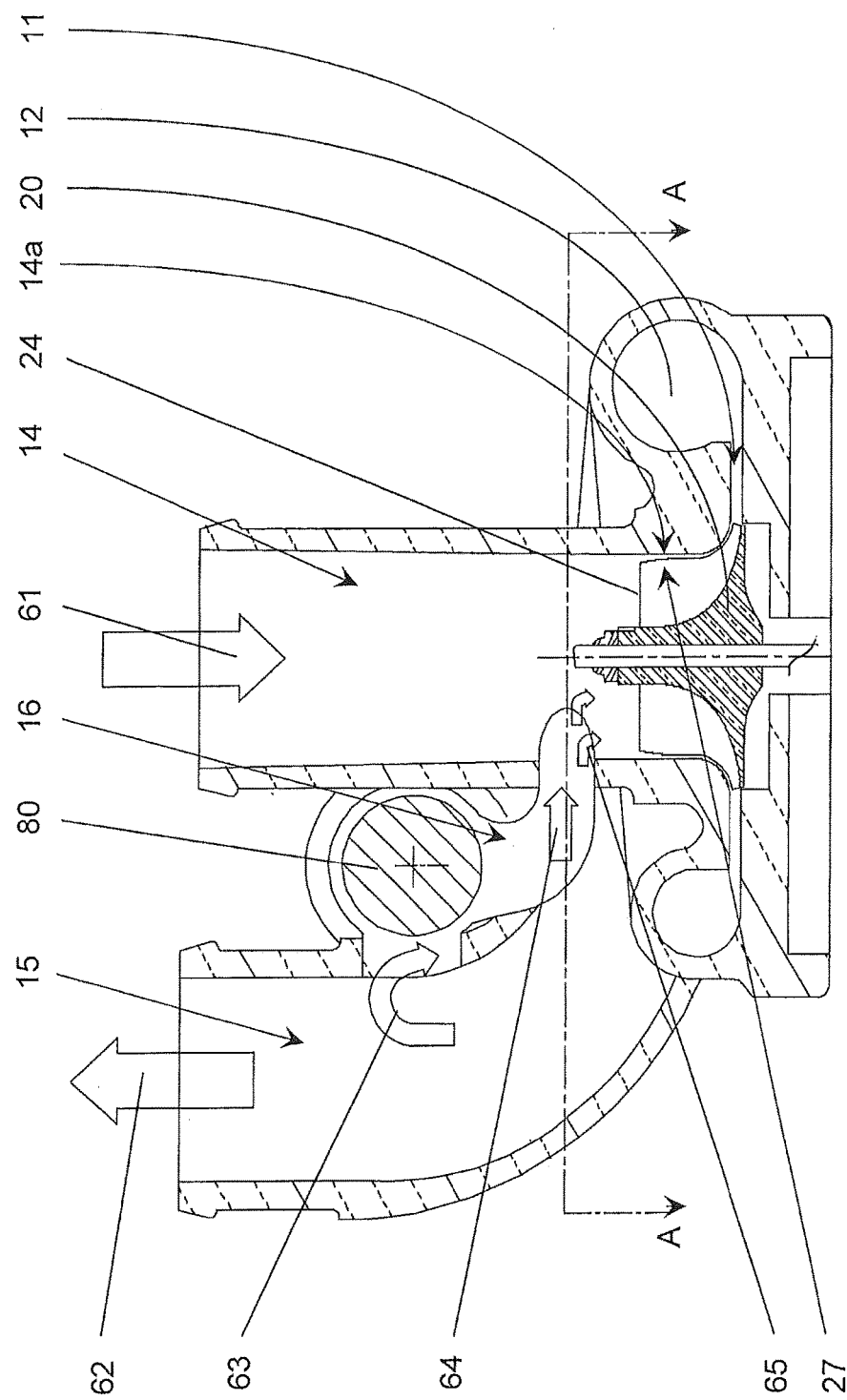
FIG. 2A depicts a section of a compressor cover with a recirculation valve.
Figure 2B:
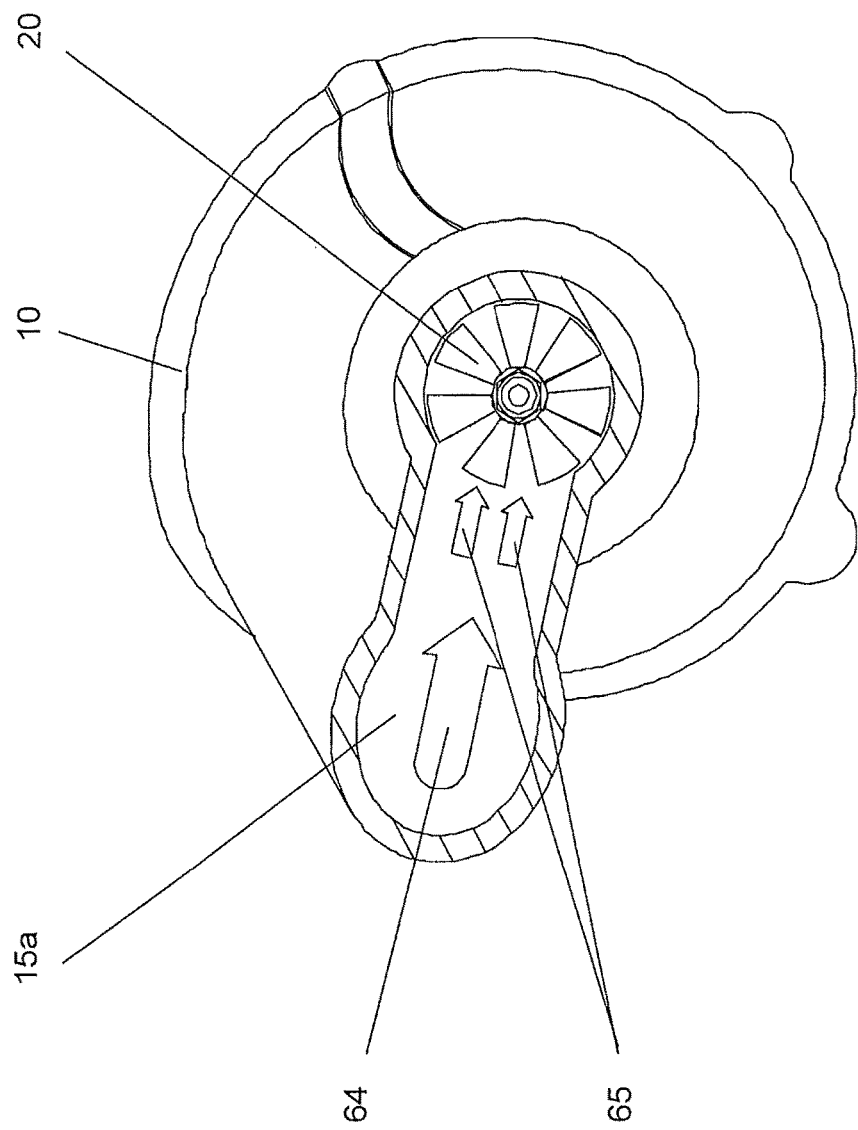
FIG. 2B depicts a section A-A of the cover of FIG. 2A.

As depicted in FIGS. 2A, 2B, air compressed by the compressor wheel (20) is driven into the diffuser (11) and into the volute (12) where velocity of air from the compressor and diffuser is collected. This air is then directed to the compressor discharge (15) where it typically connects to a duct directing the air to the vehicle intercooler and thence the engine intake manifold. When the CRV (80) is opened, some portion of the air (63) in the compressor discharge passes through a CRV duct (16), fluidly connecting the high pressure compressor discharge (15) with the (relatively) low pressure compressor inlet (14). The airflow (64, 64a) into the duct (16) is controlled by the position of the CRV (80). With the CRV open, the airflow (64) in the CRV duct "dumps" unidirectionally and generally perpendicular to the main axis of flow into the compressor inlet (14). It was found that the airflow in the compressor inlet (14) was not uniformly distributed as it impinged on the plane of the leading edges (24) of the compressor wheel. The inventors determined that both the direction of the incoming flow and the circumferential distribution about the compressor wheel axis were not uniform, resulting in undesired blade excitation with the potential for high cycle fatigue (HCF) of the compressor wheel blades, coupled with an efficiency loss for the period of each CRV event. It was also reported that for the period of CRV opening and closing, there were undesirable noises coming from the turbocharger. These noises were traced to the CRV events. The inventors designed a new configuration for the inlet, from the CRV recirculation to the compressor wheel inducer, such that the incoming "dump" of high pressure air produced neither the "whoosh" of the air through the opening in the compressor inlet, nor the "squawk" due the surge event as the CRV closed at the conclusion of the event.

Figure 3A:
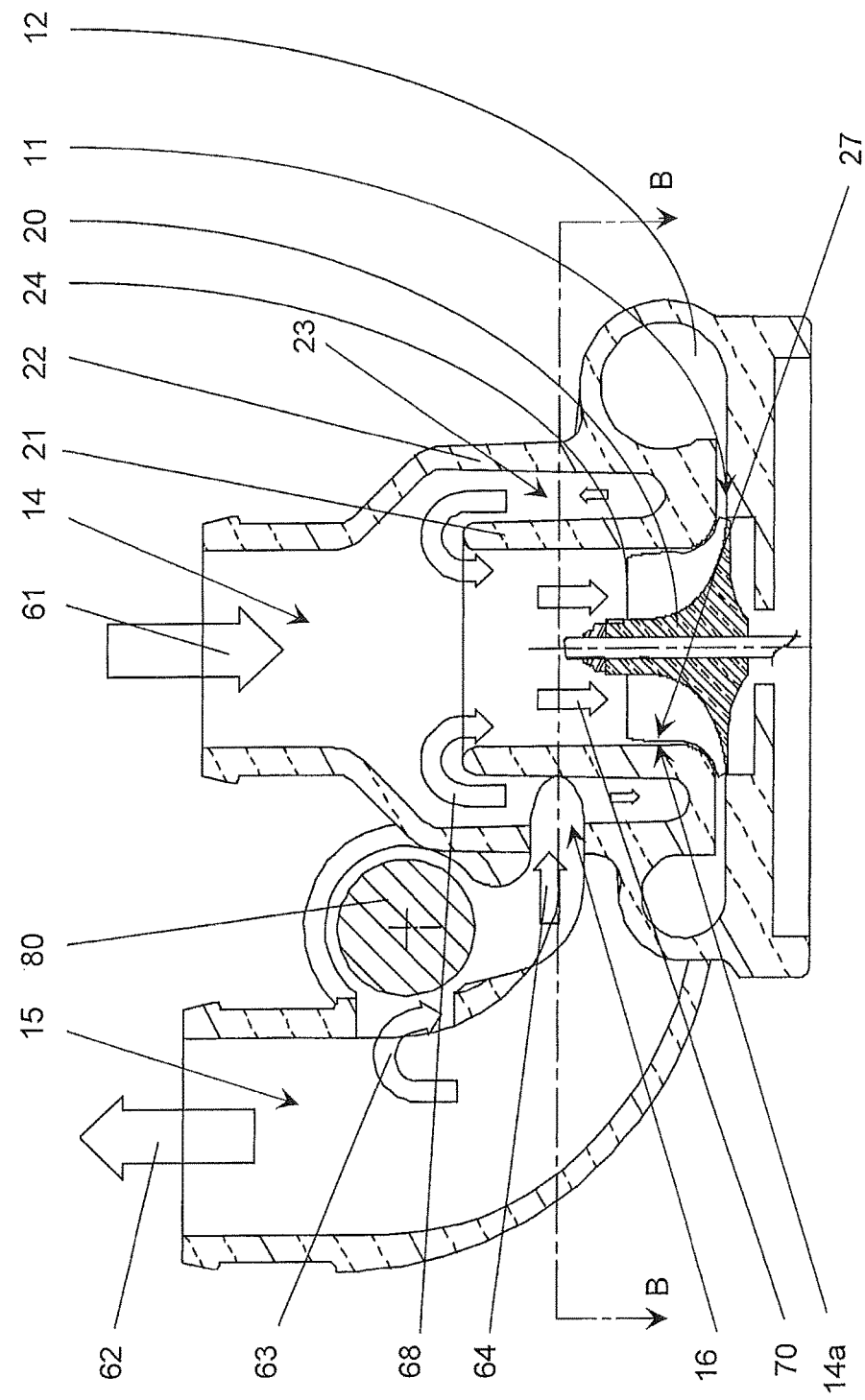
FIG. 3A depicts a section of the inventive compressor cover.
Figure 3B:
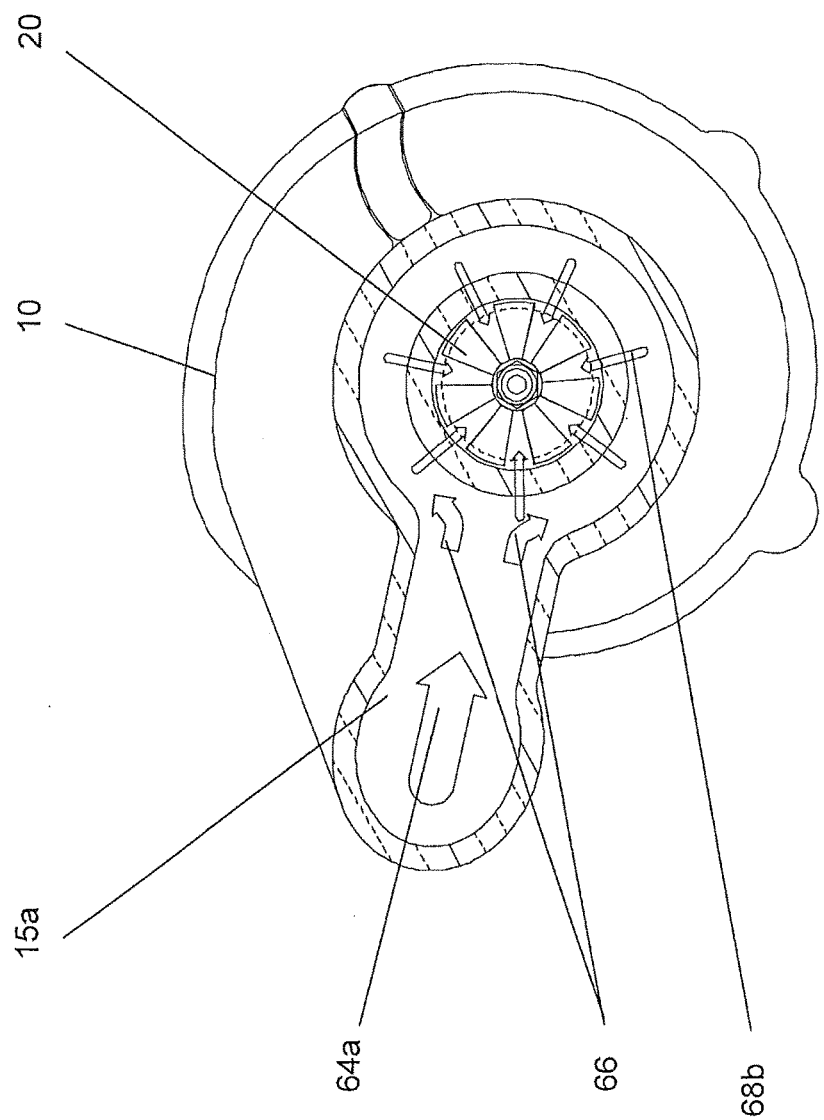
FIG. 3B depicts a section B-B of the cover of FIG. 3A.

In the first embodiment of the invention, as depicted in FIGS. 3A, 3B, the compressor housing includes a compressor inlet (14) upstream of the compressor wheel and a compressor discharge (15) downstream of said compressor wheel, the inlet comprising an outer channel wall (22) extending away from the compressor wheel in an upstream direction and forming a gas intake portion in the upper inlet section; an inner channel wall (21) within the outer channel wall, comprising a lower inlet section extending away from the compressor wheel upstream of the leading edges (24) of the compressor wheel and an inducer section (14a) downstream of the leading edges (24) of the compressor wheel; and an annular cavity (23) defined between the inner and outer channel walls, with an annular opening of the annular cavity (23) at the upstream end of the inner channel wall between the inner and outer channel walls, the compressor further comprising a compressor return valve system including a compressor recirculation valve (CRV)(80) and a recirculation duct fluidly connecting the compressor discharge (15) to the annular gas passage.

The generally cylindrical inside surface of the inner wall (21) is known as the inducer (14a) (for the zone where the wall (14a) is adjacent to the compressor wheel profile (27)), and the inlet (14)) is above the leading edges of the compressor wheel blades). The outside surface of this generally cylindrical inner wall is the inside wall of the annular cavity (23). The outside of the generally cylindrical annular cavity (23) is the generally cylindrical inside surface of the outer wall (22).

The lower bound of the generally annular cavity is typically defined by casting coring requirements and the desire to have some volume below the entrance of the CRV duct (16) into the annular cavity (23). The upper bound of the annular cavity is unbound but for the height of the inner wall (21), which should be maintained as close as possible to that of not less than 0.5 $D_i$, where $D_i$ is the inducer diameter. The height of this wall has an effect on map width.

FIGS. 3A and 3B depict an outflow (62) of compressed air from the compressor (20) to the intercooler and engine. Recirculation airflow (63) flows into the CRV duct (16). A CRV (80) controls the passage of recirculation air (64) through a recirculation duct (16), fluidly connecting the compressor discharge (15) with the compressor inlet (14). With the CRV (80) in an opened condition, compressor discharge recirculation airflow (63, 64) travels in the CRV duct (16). Predominantly radial airflow (64), from the CRV duct (16) flows into, and around (66), an annular cavity (23). Airflow (64) from the annular cavity, now evenly distributed around the 360° of the compressor inlet wall (21) flows in a generally axial direction up, and over (68) the upper end of the inner wall (21), merging with the generally axial incoming flow of air (61) from an engine air filter and which presents the compressor wheel leading edges (24) with a flow of air (70 plus 61), which is now circumferentially uniformly distributed across the plane of the leading edges (24) of the compressor wheel.

Figure 4A:
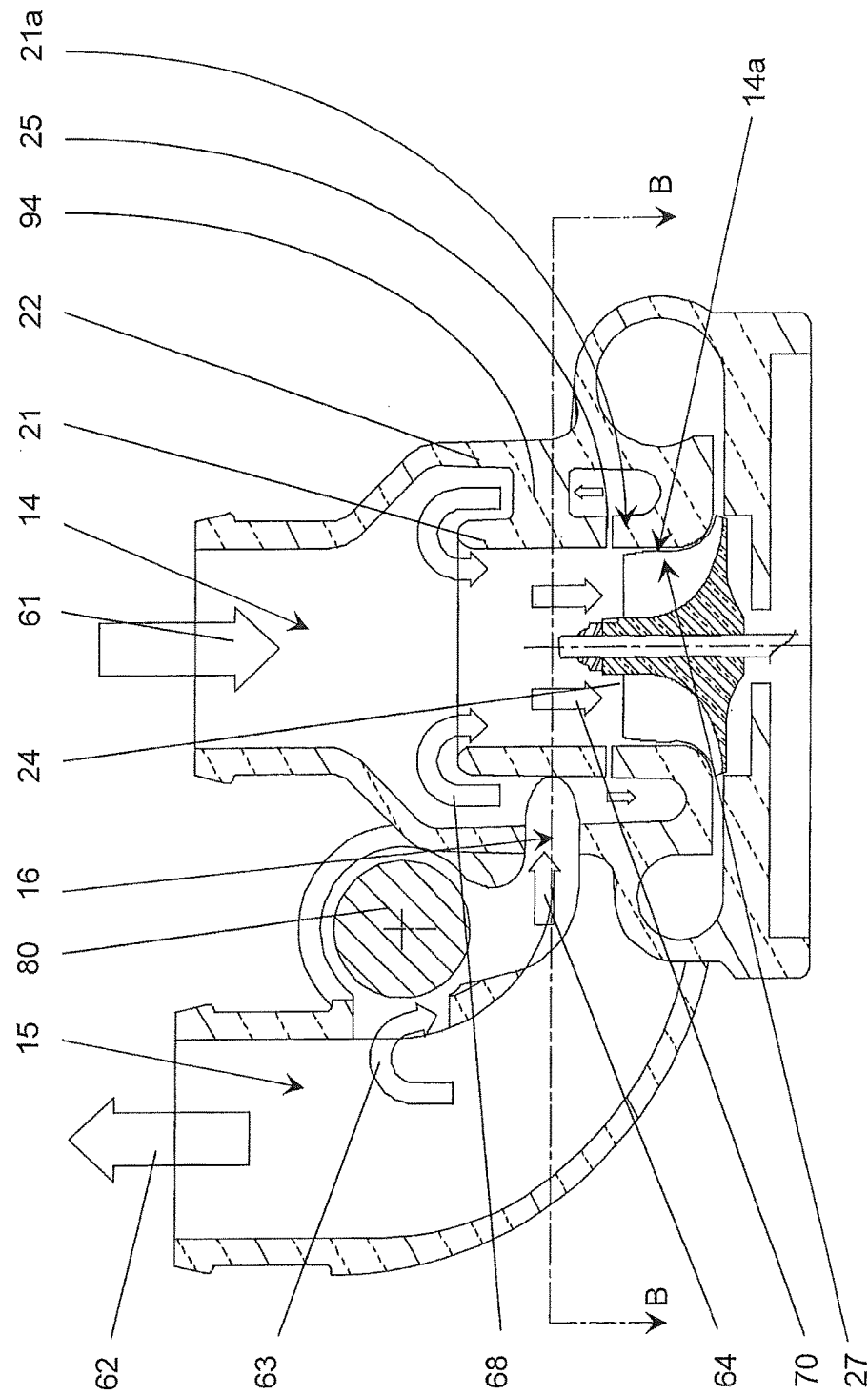
FIG. 4A depicts a section of the second embodiment of the invention"
Figure 4B:
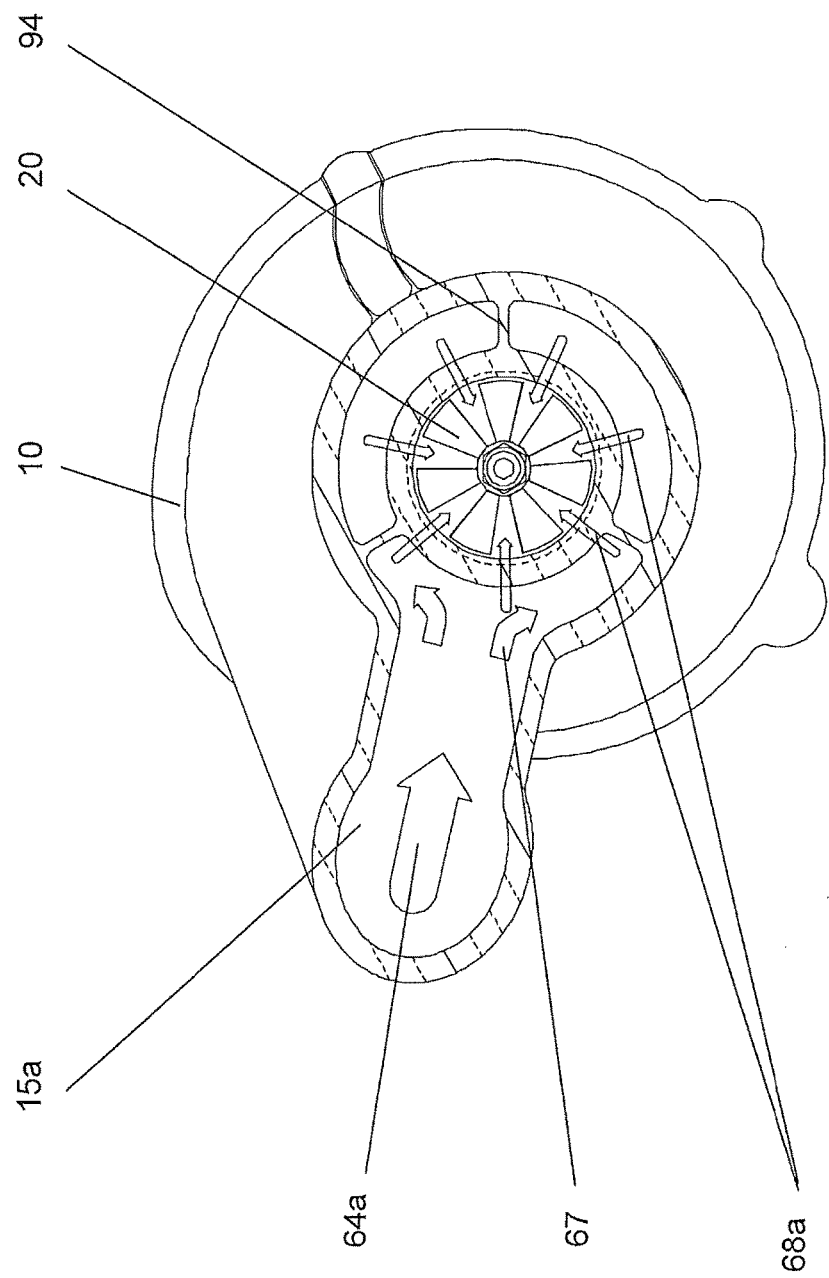
FIG. 4B depicts a section B-B of the cover of FIG. 4A.

In a variation to the first embodiment of the invention, as depicted in FIGS. 4A and 4B, in the case in which greater map width is required, this can be provided by resort to an inducer recirculation compressor cover. In this case the annular cavity (23) serves a dual function. The first function is that of a volume and a pathway for compressor inducer recirculation; the second function is as that of the first embodiment of the invention. In order to support the generally cylindrical part of the inner wall (21) which, in this embodiment is separated from the lower part (21a) of the inner wall by a recirculation slot (25), struts (94) are provided. The struts (94) are typically part of the casting and serve no structural purpose until the inducer inducer recirculation slot (25) is cut through the inner wall (21), thus separating the upper part of the inner wall from the lower part of the inner wall.

The struts are typically vertical, axial and linear in section but could be tilted, or non linear, to promote a more uniform flow over the upper end of the inner wall into the compressor wheel.

In another variation to the first embodiment of the invention, the struts are tilted or twisted such that flow from the CRV duct has some rotation (about the compressor wheel centerline) to it from: either solely the orientation and design of the struts; a solely tangential discharge from the CRV duct into the annular cavity; or with contribution from both design elements. Since pro-rotation (with respect to the rotation of the compressor wheel) of the air entering the compressor wheel causes a map shift, moving the map away from surge, the opening of the CRV valve helps prevent surge for the transient period of the CRV opening event.

Figure 5A:
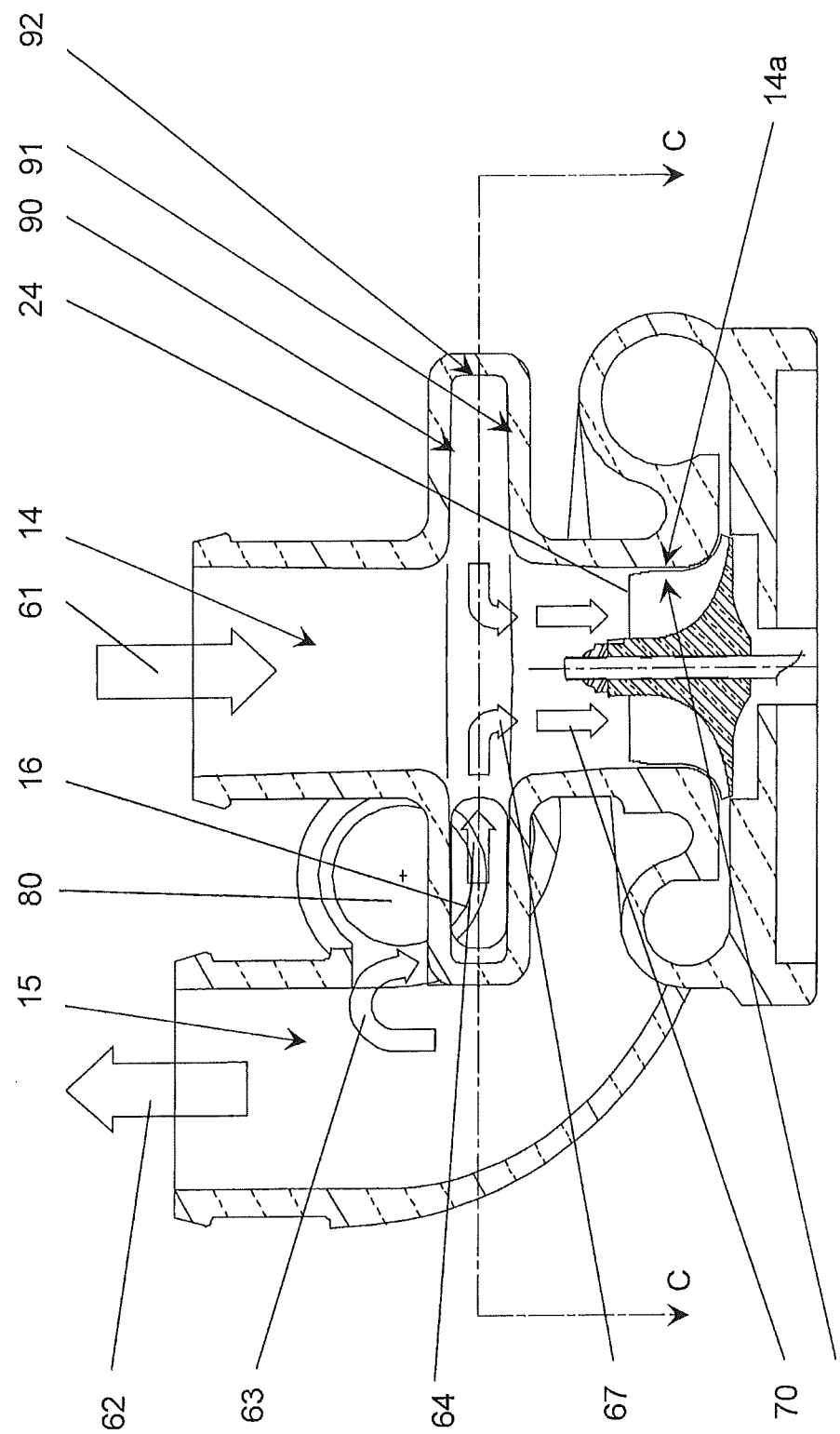
FIG. 5A depicts a variation of the first embodiment of the invention.

In a second embodiment of the invention, as depicted in FIGS. 5A and 5B, the airflows (63, 64, 64a) from the compressor discharge (15), controlled by the CRV (80), do not feed into a separate annular cavity surrounding the inner wall (21), but feed generally radially into an axially flattened, radially expanded cylindrical volume (hereafter "expanded cylindrical volume") located about the compressor inlet, axially located between the inlet to the compressor cover and the leading edge of the compressor wheel. The cylindrical volume is bound by a generally cylindrical outer wall (92) and an upstream (relative to the main axis of flow (61)) generally planar wall (90) generally perpendicular to the main axis of flow and a downstream generally planar wall (91) also generally perpendicular to the main axis of flow. These walls are described as generally perpendicular and generally parallel to the axis of flow to allow for casting draft angles. In the preferred mode, the upstream and downstream, generally perpendicular, walls are flat but they could be defined by curves. The critical function of the flattened expanded cylindrical volume is that of airflow, although from a production standpoint, it is critical that the tooling is retractable.

As in the first embodiment of the invention, as described above, the lower bound of the generally annular cavity is typically defined by casting coring requirements and the desire to have some volume below the entrance of the CRV duct (16) into the annular cavity (23). The upper bound of the annular cavity is unbound but for the height of the inner wall (21), which should be maintained as close as possible to that of not less than 0.5 $D_i$, where $D_i$ is the inducer diameter. The height of this wall has an effect on map width.

The outflow (62) of compressed air from the compressor (20) goes to the intercooler and engine. Recirculation airflow (63) flows into the CRV duct. A CRV (80) controls the passage of recirculation air (64) through a recirculation duct (16), fluidly connecting the compressor discharge (15) with the expanded cylindrical volume. With the CRV (80) in an opened condition, compressor discharge recirculation airflow (63, 64 64a) travels in the CRV duct (16). Airflow from the CRV duct flows generally radially into, and then around, the expanded cylindrical volume. Airflow (67) from the expanded cylindrical volume is turned from radial, or generally radial, to generally axial as it traverses the expanded cylindrical volume and enters into the lower part of the compressor inlet, where it merges with the axial main compressor inlet flow (61), and then to the compressor wheel leading edges (24). As the generally radial airflow (67) from the CRV duct is turned into the generally axial airflow (70) headed for the compressor wheel, the airflow acquires some axial velocity from the main compressor inlet flow (61) to enable the compressor wheel to ingest highly organized flow, which produces relatively uniform blade loadings.

While in the preferred mode of the second embodiment of the invention, the outer generally vertical wall of the cylindrical volume is generally cylindrical, and the upper and lower walls of the cylindrical volume are generally flat and generally horizontal. In a variation to the second embodiment of the invention, said walls may be more non-symmetrical complex shapes, defined by the entry conditions of the duct from the CRV to the cylindrical volume, such that the outflow from the cylindrical volume towards the compressor wheel leading edge is circumferentially uniformly distributed to the lower part of the compressor inlet.

Figure 6A:
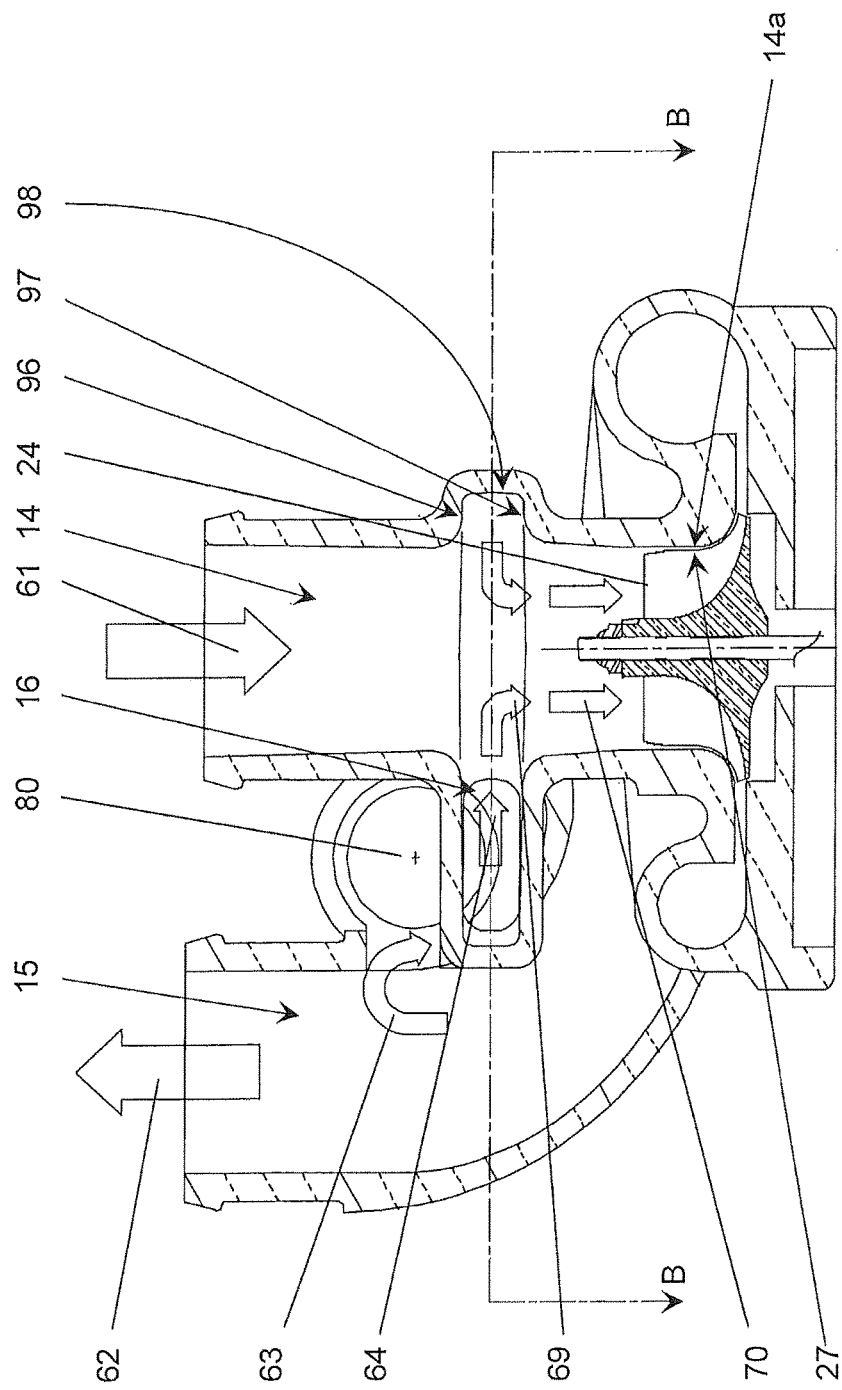
FIG. 6A depicts a variation of the second embodiment of the invention.
Figure 6B:
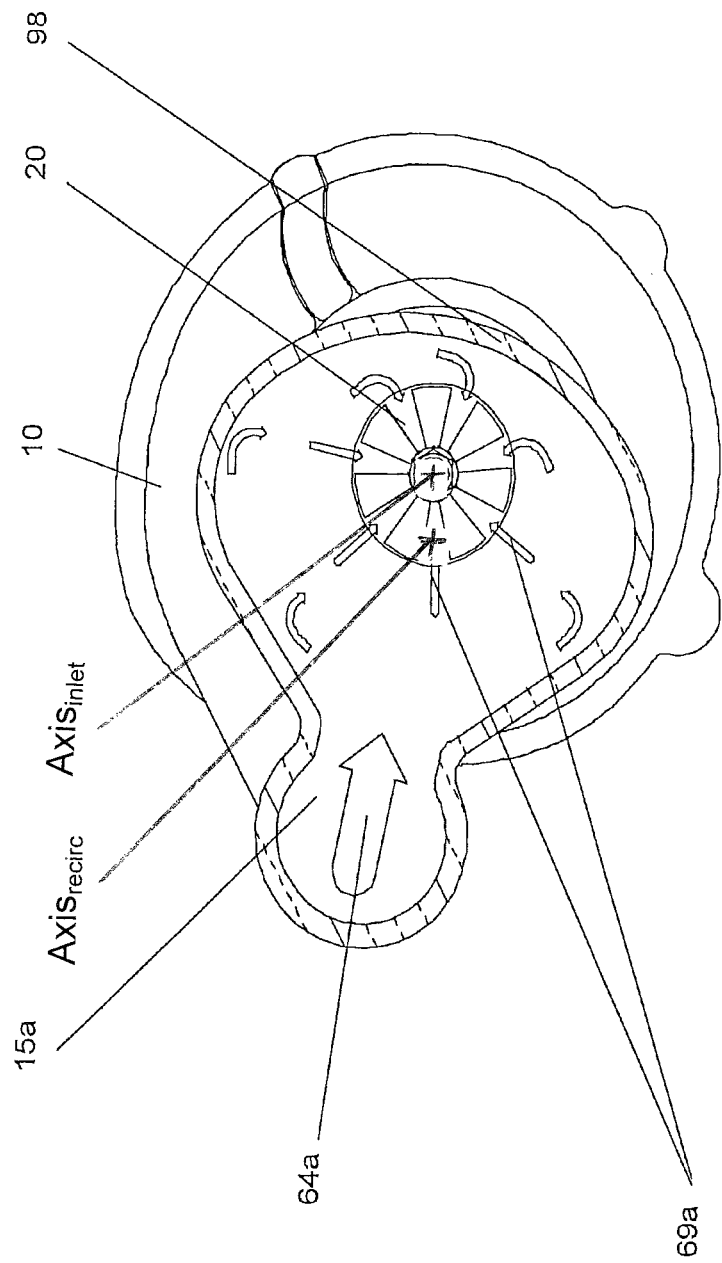
FIG. 6B depicts a section B-B of the cover of FIG. 6A.

In FIGS. 6A and 6B, the inventors devised a more complex shape (98) to manipulate the generally radial airflow (62) from the CRV duct into the generally axial, circumferentially uniformly distributed, airflow (67 and 65) into the lower part of the compressor inlet where it merges with the axial main compressor inlet flow (61) and then to the compressor wheel leading edge (24). This airflow change in direction and nature is executed with a non-symmetric geometry for both the outer generally vertical wall (98) of the cylindrical volume and the upper (96) and lower (97) generally horizontal walls of the cylindrical volume. As the generally radial airflow (69) from the CRV duct is turned into the generally axial airflow (70) headed for the compressor wheel, the airflow acquires some axial velocity from the main compressor inlet flow (61) to enable the compressor wheel to ingest highly organized flow (61, 70) which produces relatively uniform blade loadings.

The inventive concept of transitioning the generally unidirectional radial recirculation airflow from the compressor recirculation valve through an annular volume so that it is distributed circumferentially before it reaches the generally axial airflow of the compressor inlet, merging uniformly with the general axial inlet flow and presenting the compressor wheel with airflow of "circumferentially uniform" flow velocity, is not limited to the recirculation of air within the compressor, but is applicable to solving similar situations where uniformity of introduction of gas from a radial flow into an axial flow is desired, e.g., the introduction of exhaust gas recirculation (EGR) from an engine exhaust manifold into the air flow upstream of a compressor. Here also, by being transitioned prior to merging, the problem of compressor wheel blade flow separation can be overcome.

Now that the invention has been described, what is claimed is:

1. A compressor for compressing gas, said compressor comprising:
   a compressor housing including a compressor inlet (14) and a compressor discharge (15), said compressor inlet (14) being defined by a channel wall (22) having a first circumference and having a center,
   a compressor wheel (20) mounted for rotation within said compressor housing between said compressor inlet (14) and compressor discharge (15),
   a compressor recirculation duct (16) providing fluid communication between the compressor discharge (15) and the compressor inlet (14),
   a compressor recirculation valve (80) for control of air flow in said compressor return recirculation duct,
   an annular transition cavity formed by a radially expanded cross-sectional area of the channel wall (22) arranged about the entire circumference of the compressor inlet (14) for introducing air from the compressor recirculation duct (16) into the compressor inlet (14) about the entire circumference of the compressor inlet (14),
   wherein rotation of said compressor wheel causes air to be taken in at the compressor inlet (14) at a first pressure and discharged at the compressor discharge (15) at a pressure higher than said first pressure,
   wherein opening the compressor recirculation valve (80) allows air from the compressor discharge to pass through the compressor recirculation duct (16), and
   wherein said annular transition cavity formed by said radially expanded cross-sectional area of the channel wall (22) causes said air introduced from the compressor recirculation duct (16) into the compressor inlet (14) to be distributed about the circumference of the compressor inlet.

2. The compressor as in claim 1, wherein said radially expanded cross-sectional area of the channel wall (22) is co-axial with said compressor inlet (14) channel wall (22) having said first circumference.

3. The compressor as in claim 1, wherein said annular transition cavity formed by a radially expanded cross-sectional area of the channel wall (22) is formed by a radially expanded channel wall (22) having a center that is not co-axial with said compressor inlet (14).

* * * * *